United States Patent [19]
Vetter

[11] Patent Number: 5,504,797
[45] Date of Patent: Apr. 2, 1996

[54] ROTARY-ANODE X-RAY TUBE COMPRISING A SLEEVE BEARING

[75] Inventor: Axel Vetter, Hamburg, Germany

[73] Assignee: U.S. Philips Corporation, New York, N.Y.

[21] Appl. No.: 344,207

[22] Filed: Nov. 17, 1994

[30] Foreign Application Priority Data

Nov. 23, 1993 [DE] Germany .......... 43 39 817.0

[51] Int. Cl.⁶ .................................... H01J 35/26
[52] U.S. Cl. .......................... 378/133; 378/132
[58] Field of Search ................... 378/133, 132, 378/131, 125, 144, 201, 202; 384/397, 474

[56] References Cited

U.S. PATENT DOCUMENTS

| | | |
|---|---|---|
| 4,342,375 | 8/1982 | Lyden . |
| 4,396,529 | 8/1983 | Price et al. . |
| 5,068,885 | 11/1991 | Vetter ......... 378/133 |
| 5,077,775 | 12/1991 | Vetter ......... 378/133 X |
| 5,210,781 | 5/1993 | Ono et al. ......... 378/133 X |

FOREIGN PATENT DOCUMENTS

| | | | |
|---|---|---|---|
| 0378273 | 7/1990 | European Pat. Off. | H01J 35/10 |
| 0479198 | 4/1992 | European Pat. Off. | H01J 35/10 |

*Primary Examiner*—David P. Porta
*Attorney, Agent, or Firm*—Anne E. Barschall

[57] ABSTRACT

A rotary-anode X-ray tube includes a sleeve bearing, notably a helical groove bearing, for journalling the rotary anode. The bearing comprises a stationary and a rotatable bearing portion, a liquid lubricant being present between the two bearing portions and at least one of the bearing, portions being provided with at least one capillary-type lubricant duct. The lubricant duct can be particularly simply formed by imparting to the duct a cross-sectional area which is greater than permissible so as to achieve a capillary effect and by arranging in the lubricant duct a member which can be wetted by the lubricant and which extends over at least a part of the length of the lubricant duct, thus reducing the cross-sectional area of the lubricant duct to such an extent that a capillary effect is achieved.

5 Claims, 2 Drawing Sheets

ROTARY-ANODE X-RAY TUBE COMPRISING A SLEEVE BEARING

The invention relates to a rotary-anode X-ray tube comprising a sleeve bearing, notably a helical-groove bearing, which serves to journal the rotary anode and which comprises a stationary and a rotatable bearing portion, a liquid lubricant being present between the two bearing portions and at least one of the two bearing portions comprising at least one capillary-type lubricant duct.

Such a rotary-anode X-ray tube is known from U.S. Pat. No. 5,068,885. The lubricant ducts therein must have a capillary effect in order to ensure that the capillary forces do not allow the lubricant to flow into the vacuum space of the X-ray tube, not even during rotation of the rotary anode. The capillary effect is dependent on the length and the diameter of the lubricant duct. When a gallium alloy is used as the lubricant, a capillary rise height of at the most 45 mm occurs for a lubricant duct diameter of 0.5 mm. In the case of longer lubricant ducts, the diameter of the duct must even be smaller. Bores of such small diameter, however, can be realised over the described length only with great difficulty.

It is an object of the present invention to simplify the formation of long lubricant ducts in a rotary-anode X-ray tube of the kind set forth. This object is achieved in accordance with the invention in that the lubricant duct has a cross-section which is greater than permitted so as to achieve a capillary effect and that in the lubricant there is arranged a member which can be wetted by the lubricant and which extends at least over a part of the length of the lubricant duct and reduces the free cross-section in the lubricant duct to such an extent that a capillary effect is obtained.

Thus, in accordance with the invention there is first formed a bore whose diameter is greater than permitted so as to achieve the capillary effect; for example, in the case of a lubricant duct having a length of 50 mm or more, the diameter of the bore may amount to 1 mm. Such a bore can be comparatively simply realised, for example by spark erosion, but does not exhibit a capillary effect. This effect is achieved in that in the lubricant duct constituted by the bore there is arranged a member which can be wetted by the lubricant and which reduces the free cross-section of the lubricant duct to such an extent that a capillary effect is obtained.

In the lubricant duct of a preferred embodiment there is arranged a wire whose outer diameter is smaller than the inner diameter of the lubricant duct. By arranging a wire having an outer diameter of 1 mm in a lubricant duct having an inner diameter of 1.1 mm, a lubricant duct is realised which has a capillary effect similar to that of a bore of 0.1 mm.

In a preferred embodiment of the invention the wire is particularly simply secured in the lubricant duct in that in one location, preferably at the end, the wire is shaped so that it is clamped in the lubricant duct.

In a further embodiment of the invention an open-pore member is arranged in the lubricant duct.

The member can then tip; the entire cross-section of the duct. However, since it is an open-pore and porous member, the capillary effect is achieved by the porous structure of the member.

The invention will be described in detail hereinafter with reference to the drawing. Therein:

Figure 1:
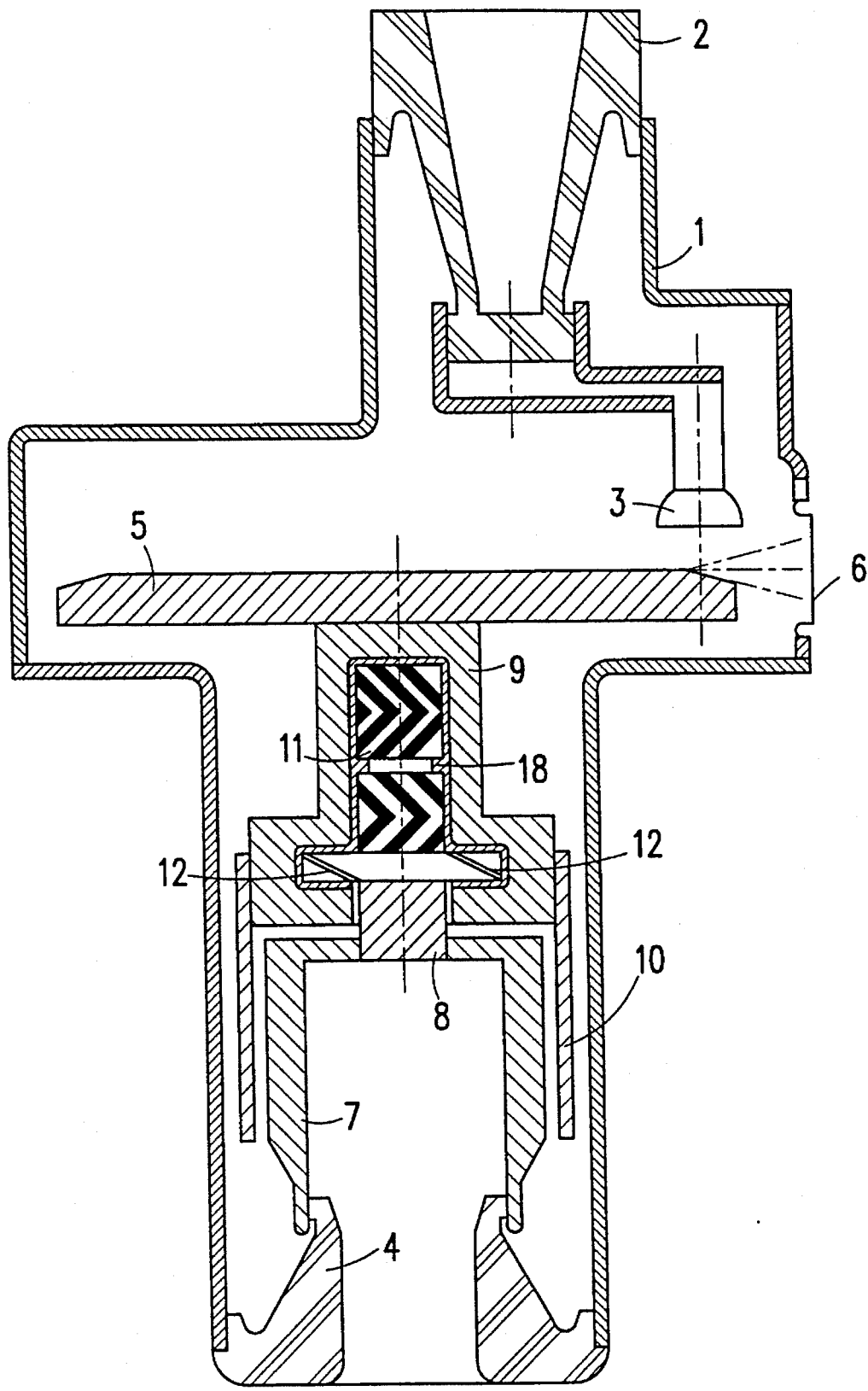
FIG. 1 shows a rotary-anode X-ray tube in which the invention can be used.

The rotary-anode X-ray tube shown in FIG. 1 comprises a metal envelope 1 whereto the cathode 3 is secured via a first insulator 2 and whereto the rotary anode is secured via a second insulator 4. The rotary anode comprises an anode disc 5 whose surface which faces the cathode generates X-rays when a high voltage is applied. The X-rays emanate via a preferably beryllium radiation exit window 6 in the envelope. Via a sleeve bearing, the anode disc 5 is connected to a supporting member 7 which is connected to the second insulator 4. The bearing comprises a rotationally symmetrical bearing portion 8 which is rigidly connected to the supporting member 7 and which is enclosed by a rotatable beating portion 9 which is connected to the anode disc 5, the outer surface of the stationary bearing portion being provided with a fishbone-like groove pattern 11 (helical grooves). A pattern of this kind is provided not only on the cylinder surface of the fixed bearing portion 8, but also (not visible in the drawing) on its end faces.

In the stationary beating portion there are provided lubricant ducts 12 whose purpose is described in detail in EP-A 378 273 which is explicitly referred to herein. Further lubricant ducts which are not shown in the drawing may also be provided, for example a lubricant duct which connects the zone 18 in the centre between the two halves of the helical-groove bearing 11, serving to take up the radial bearing forces, to one of the end faces of the stationary bearing portion.

Figure 2:
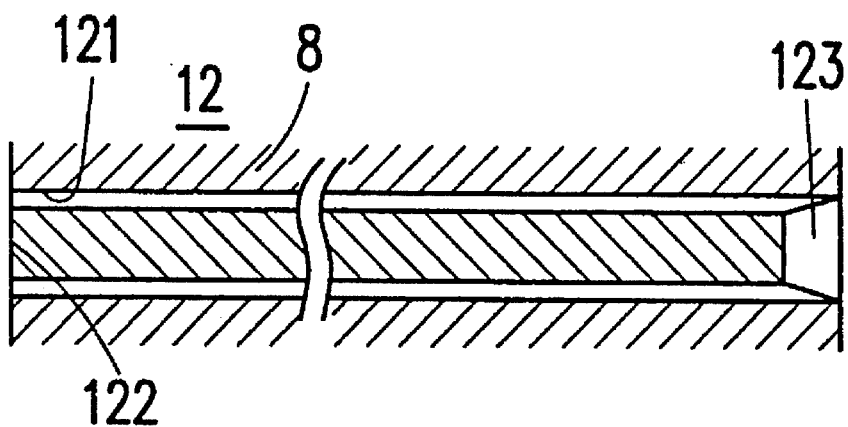
FIG. 2 shows a first embodiment of a lubricant duct.

FIG. 2 shows such a lubricant duct at an increased scale. The lubricant duct is formed by a bore 121 of a diameter of, for example 1.1 mm in the stationary bearing portion 8 and by a member in the form of a wire 122 which is arranged therein and which has an outer diameter of, for example 1 mm. The clearance remaining between the wire 122 and the inner wall of the bore 121 offers a capillary effect which corresponds to that of a bore having a diameter of 0.1 mm. In order to achieve the capillary effect, the wire must be wettable by the lubricant. To this end, the wire and the inner surface of the bore may consist of the same material as the bearing portions 8 or 9; when a gallium alloy is used as the lubricant, satisfactory results are obtained, for example by means of a tungsten or molybdenum wire whose surface has preferably been silver-plated to prevent oxidation and to achieve even better wettability.

At one end 123 the wire 122 is flattened, i.e. distorted by squeezing so that it is clamped and fixed in the bore 121. Consequently, it cannot move in the axial direction in the bore and contact the bearing surface rotating with respect to the wire. The capillary effect is maintained.

Figure 3:
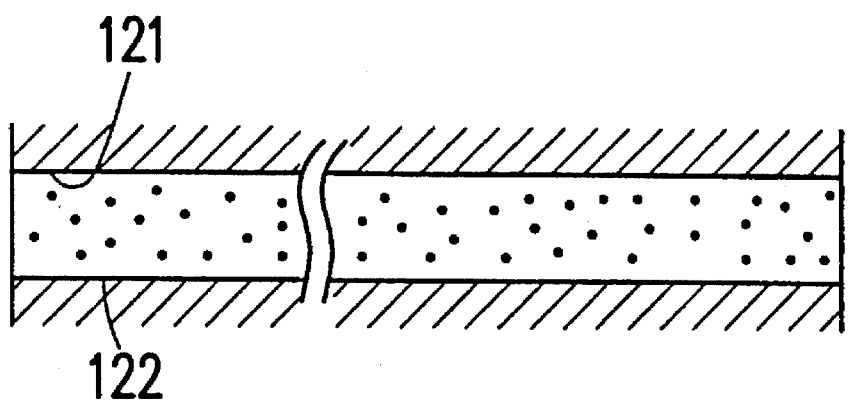
FIG. 3 shows a further embodiment.

FIG. 3 shows a second embodiment of a lubricant duct. In this case the lubricant duct accommodates an open-pore member 122 which is arranged in the bore 121 and whose pores communicate with one another, thus providing a capillary effect. The member 122 must be made of a material which can be wetted by the lubricant, for example a coarsely sintered molybdenum or tungsten.

I claim:

1. A rotary-anode X-ray tube comprising a sleeve bearing, having helical grooves, which serves to journal the rotary anode and which comprises a stationary and a rotatable bearing portion, a liquid lubricant being present between the two bearing portions and at least one of the two bearing portions comprising at least one lubricant duct coupled to a vacuum, where the lubricant duct has a cross-section which is greater than permitted so as to achieve a capillary effect and that in the lubricant there is arranged a member which can be wetted by the lubricant and which extends at least over a part of the length of the lubricant duct and reduces the free cross-section in the lubricant duct to such an extent that a capillary effect is obtained.

2. A rotary-anode X-ray tube as claimed in claim 1, wherein in the lubricant duct there is arranged a wire whose outer diameter is smaller than the inner diameter of the lubricant duct.

3. A rotary-anode X-ray tube as claimed in claim 2, wherein the wire is shaped so that it is clamped in the lubricant duct.

4. A rotary-anode X-ray tube as claimed in claim 1, wherein an open-pore member is arranged in the lubricant duct.

5. A rotary-anode X-ray tube comprising a sleeve bearing having a liquid lubricant duct communicating with a vacuum, the duct having a cross-section greater than permitted to achieve a capillary effect and a duct length greater than permitted to achieve a capillary effect, the duct including a member wetted by the lubricant reducing the cross-section and having a member length sufficient to achieve a capillary effect.

* * * * *